US012169907B2

(12) United States Patent
Song et al.

(10) Patent No.: US 12,169,907 B2
(45) Date of Patent: Dec. 17, 2024

(54) AGILEGAN-BASED REFINEMENT METHOD AND FRAMEWORK FOR CONSISTENT TEXTURE GENERATION

(71) Applicant: Lemon Inc., Grand Cayman (KY)

(72) Inventors: Guoxian Song, Singapore (SG); Jing Liu, Los Angeles, CA (US); Chunpong Lai, Los Angeles, CA (US); Linjie Luo, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 123 days.

(21) Appl. No.: 17/534,631

(22) Filed: Nov. 24, 2021

(65) Prior Publication Data

US 2023/0162320 A1    May 25, 2023

(51) Int. Cl.
| | |
|---|---|
| *G06T 5/50* | (2006.01) |
| *G06N 3/045* | (2023.01) |
| *G06T 3/00* | (2024.01) |
| *G06T 3/04* | (2024.01) |
| *G06V 10/774* | (2022.01) |
| *G06V 10/82* | (2022.01) |

(52) U.S. Cl.
CPC ............... *G06T 3/00* (2013.01); *G06N 3/045* (2023.01); *G06T 3/04* (2024.01); *G06T 5/50* (2013.01); *G06V 10/774* (2022.01); *G06V 10/82* (2022.01); *G06T 2207/30201* (2013.01)

(58) Field of Classification Search
None
See application file for complete search history.

(56) References Cited

U.S. PATENT DOCUMENTS

| | | | |
|---|---|---|---|
| 2020/0356591 | A1 | 11/2020 | Yada et al. |
| 2021/0264234 | A1 | 8/2021 | Paris et al. |
| 2021/0343063 | A1 | 11/2021 | Garbin et al. |
| 2021/0358177 | A1 | 11/2021 | Park et al. |

OTHER PUBLICATIONS

Park, Taesung, et al. "Swapping autoencoder for deep image manipulation." Advances in Neural Information Processing Systems 33 (2020): 7198-7211. (Year: 2020).*

(Continued)

*Primary Examiner* — Vincent Rudolph
*Assistant Examiner* — Meredith Taylor
(74) *Attorney, Agent, or Firm* — Faegre Drinker Biddle & Reath LLP (57) ABSTRACT

Methods and systems for generating a texturized image are disclosed. Some examples may include: receiving an input image, receiving an exemplar texture image, generating, using an encoder, a first latent code vector representation based on the input image, generating, using a generative adversarial network generator, a second latent code vector representation based on the exemplar texture image, blending the first latent code vector representation and the second latent code vector representation to obtain a blended latent code vector representation, generating, by the GAN generator, a texturized image based on the blended latent code vector representation and providing the texturized image as an output image.

18 Claims, 6 Drawing Sheets

(56) References Cited

OTHER PUBLICATIONS

Gur, Shir, Sagie Benaim, and Lior Wolf. "Hierarchical patch vaegan: Generating diverse videos from a single sample." Advances in Neural Information Processing Systems 33 (2020): 16761-16772. (Year: 2020).*
https://hippocampus-garden.com/stylegans/ (Year: 2021).*
Song, Guoxian, et al. "Agilegan: stylizing portraits by inversion-consistent transfer learning." ACM Transactions on Graphics (TOG) 40.4 (2021): 1-13. (Year: 2021).*
Larsen, Anders Boesen Lindbo, et al. "Autoencoding beyond pixels using a learned similarity metric." International conference on machine learning. PMLR, 2016. (Year: 2016).*
Karras, Tero, et al. "Analyzing and improving the image quality of stylegan." Proceedings of the IEEE/CVF conference on computer vision and pattern recognition. 2020. (Year: 2020).*
International Search Report mailed Jun. 23, 2023 for International Application No. PCT/SG2022/050802.

\* cited by examiner

AGILEGAN-BASED REFINEMENT METHOD AND FRAMEWORK FOR CONSISTENT TEXTURE GENERATION

BACKGROUND

Portraiture, the art of depicting the appearance of a subject, is an important art form dating back to the beginning of civilization. It has evolved beyond faithful depiction into more creative interpretations with a plethora of styles, such as abstract art, Cubism and cartoon. Automatically stylized portraiture has undergone rapid progress in recent years due to advances in deep learning. Early methods involving neural style have convincingly demonstrated the ability to transfer textural styles from an exemplar source to target images, with real photos transformed into Van Gogh or Picasso paintings. However, when it comes to portraiture, these methods largely failed to capture the important geometry-dependent motifs of different portraiture styles, thus falling short in stylization quality.

Image-to-image translation methods were later introduced to "translate" images from a source domain to a target domain using paired datasets in a supervised manner or using unpaired datasets in an unsupervised setting. These methods have been explored for portrait stylization, e.g., self-to-anime and cartoon. AgileGAN, a most recent state-of-art framework can generate high quality stylistic portraits via inversion-consistent transfer learning while providing greater agility when creating high-quality and high-resolution (1024×1024) portrait stylization models, require only a limited number of style exemplars (~100), and can be trained in a short amount of time (~1 hour).

However, with the AgileGAN-based portrait stylization workflows, the generated texture is uncontrollable. That is, the texture of generated images varies depending on the user input and also the training exemplars. For example, in the realm of sculpture styles, several materials for different sculptures may exist including, but not limited to marble, limestone, wood, metallic, etc. Directly using an existing AgileGAN-based portrait stylization workflows may generate a stylized image having an uncontrollable texture; that is, the stylized image may look different and include different materials depending on a user input. Accordingly, a new texture refinement workflow for AgileGAN-based portrait stylization pipelines is needed.

It is with respect to these and other general considerations that embodiments have been described. Although relatively specific problems have been discussed, the examples described herein should not be limited to solving the specific problems identified in the background above.

SUMMARY

In accordance with examples of the present disclosure, a refinement method for a GAN, and more specifically, an AgileGAN-based portrait stylization workflow, is described. In examples, after training a stylized generator using an AgileGAN method for example, a post-processing step may be included to further refine the texture thereby minimizing texture inconsistencies. The post-processing step may include selecting a desired style exemplar image, style inversion, and latent code blending. Thus, at least one benefit of using such a post-processing step may include ensuring that the generated stylized images are texture consistent with a desired style exemplar image.

As disclosed herein, a post-processing technique may be applied to ensure image texture generated by a GAN generator is consistent with an exemplar texture image. In accordance with examples of the present disclosure, at least one aspect relates to a method for generating a texturized image. The method may include receiving an input image. The method may include receiving an exemplar texture image. The method may include generating, using an encoder, a first latent code vector representation based on the input image. The method may include generating, using a generative adversarial network generator, a second latent code vector representation based on the exemplar texture image. The method may include blending the first latent code vector representation and the second latent code vector representation to obtain a blended latent code vector representation. The method may include generating, by the GAN generator, a texturized image based on the blended latent code vector representation. The method may include providing the texturized image as an output.

Another aspect of the present disclosure relates to a system for generating a texturized image. The system may include one or more hardware processors configured by machine-readable instructions for generating a texturized image. The machine-readable instructions may be configured to receive an input image. The machine-readable instructions may be configured to receive an exemplar texture image. The machine-readable instructions may be configured to generate, use an encoder, a first latent code vector representation based on the input image. The machine-readable instructions may be configured to generate, use a generative adversarial network generator, a second latent code vector representation based on the exemplar texture image. The machine-readable instructions may be configured to blend the first latent code vector representation and the second latent code vector representation to obtain a blended latent code vector representation. The machine-readable instructions may be configured to generate, by the GAN generator, a texturized image based on the blended latent code vector representation. The machine-readable instructions may be configured to provide the texturized image as an output.

Another aspect of the present disclosure relates to a computer-readable storage medium for generating a texturized image. In some embodiments, the computer-readable storage medium may include instructions being executable by one or more processors to receive an input image. In some embodiments, the computer-readable storage medium may include instructions being executable by one or more processors to receive an exemplar texture image. In some embodiments, the computer-readable storage medium may include instructions being executable by one or more processors to generate, use an encoder, a first latent code vector representation based on the input image. In some embodiments, the computer-readable storage medium may include instructions being executable by one or more processors to generate, use a generative adversarial network generator, a second latent code vector representation based on the exemplar texture image. In some embodiments, the computer-readable storage medium may include instructions being executable by one or more processors to blend the first latent code vector representation and the second latent code vector representation to obtain a blended latent code vector representation. In some embodiments, the computer-readable storage medium may include instructions being executable by one or more processors to generate, by the GAN generator, a texturized image based on the blended latent code vector representation. In some embodiments, the computer-readable storage medium may include instructions being executable by one or more processors to provide the texturized image as an output.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Stylizing facial images in an artistic manner has been explored in the context of non-photorealistic rendering. Early approaches relied on low level histogram matching using linear filters. Neural style transfer, by matching feature statistics in convolutional layers, led to early exciting results via deep learning. Since then, several improvements directed to enforcing local patterns in deep feature space via a Markov random field (MRF) and extending style transfer to video and improved the quality by imposing temporal constraints have been proposed. Although these methods can achieve generally compelling results for several artistic styles, they usually fail on styles involving significant geometric deformation of facial features, such as cartoonization.

For more general stylization, image-to-image (I2I) translation may be used to translate an input image from a source domain to a target domain.

Conditional generative adversarial networks (GAN) may be implemented to learn the input-to-output mapping. Similar ideas have been applied to various tasks, such as sketches-to-photographs and attribute-to-images. For example, the well-known cycle-consistency loss in Cycle-GAN has been proposed to improve network training stability for the unpaired setting. Unsupervised methods have also been used in cartoonization. Further, CycleGAN has been extended to cross-domain anime portrait generation, and other unsupervised methods have incorporated an attention module and a learnable normalization function for cartoon face generation, where their attention-guided model can flexibly control the amount of change in shape and texture. GANs have been used to synthesize images that ideally match the training dataset distribution via adversarial training. GANs have been applied to various areas, including but not limited to image inpainting, image manipulation, and texture synthesis. Various advancements have been made to improve the architecture, synthesis quality, and training stability of GANs.

Since GANs are typically designed to generate realistic images by sampling from a known distribution in latent space, GAN inversion addresses the complementary problem of finding the most accurate latent code, when given an input image, that will reconstruct that image. One approach is based on optimization, which is directly optimizing the latent code to minimize the pixel-wise reconstruction loss for a single input instance. Another approach is learning-based, in which a deterministic model is trained by minimizing the difference between the input and synthesized images. Other works combine these the optimization and learning-based approaches by learning an encoder that produces a good initialization for subsequent optimization. In addition to image reconstruction, some examples also use inversion when undertaking image manipulation. For example, a hybrid method may encode images into a semantic manipulable domain for image editing. In addition, a generic Pixel2Style2Pixel (PSP) encoder has been proposed; such an encoder is based on a dedicated identity loss for embedding images in several real image translation tasks, such as inpainting and super resolution.

As previously mentioned, finding a best inversion mapping in terms of reconstruction in an original GAN network may be misguided, because what may be best for realistic image generators may not be best for other stylized generators. Instead, a learned inversion mapping that also optimizes for matching the distribution of latent codes to the Gaussian latent distribution in the original StyleGAN2 may lead to better results across a range of different stylized generators. In other words, matching latent distributions when learning the inversion leads to robust embedding across different styles, and is better than aiming for the best reconstruction embedding for realistic images.

However, with the GAN, and more specifically Agile-GAN-based portrait stylization workflows, the generated texture tends to be uncontrollable. That is, the texture of generated images varies depending on the user input and also the training exemplars. For example, in the realm of sculpture styles, several materials for different sculptures may exist including, but not limited to marble, limestone, wood, metallic, etc. Directly using an existing AgileGAN-based portrait stylization workflows may generate a stylized image having an uncontrollable texture; that is, the stylized image may look different and include different materials depending on a user input.

In accordance with examples of the present disclosure, a refinement method for a GAN, and more specifically, an AgileGAN-based portrait stylization workflow, is described. In examples, after training a stylized generator using an AgileGAN method for example, a post-processing step may be included to further refine the texture thereby minimizing texture inconsistencies. The post-processing step may include selecting a desired style exemplar image, style inversion, and latent code blending. Thus, at least one benefit of using such a post-processing step may include ensuring that the generated stylized images are texture consistent with a desired style exemplar image.

Figure 1:
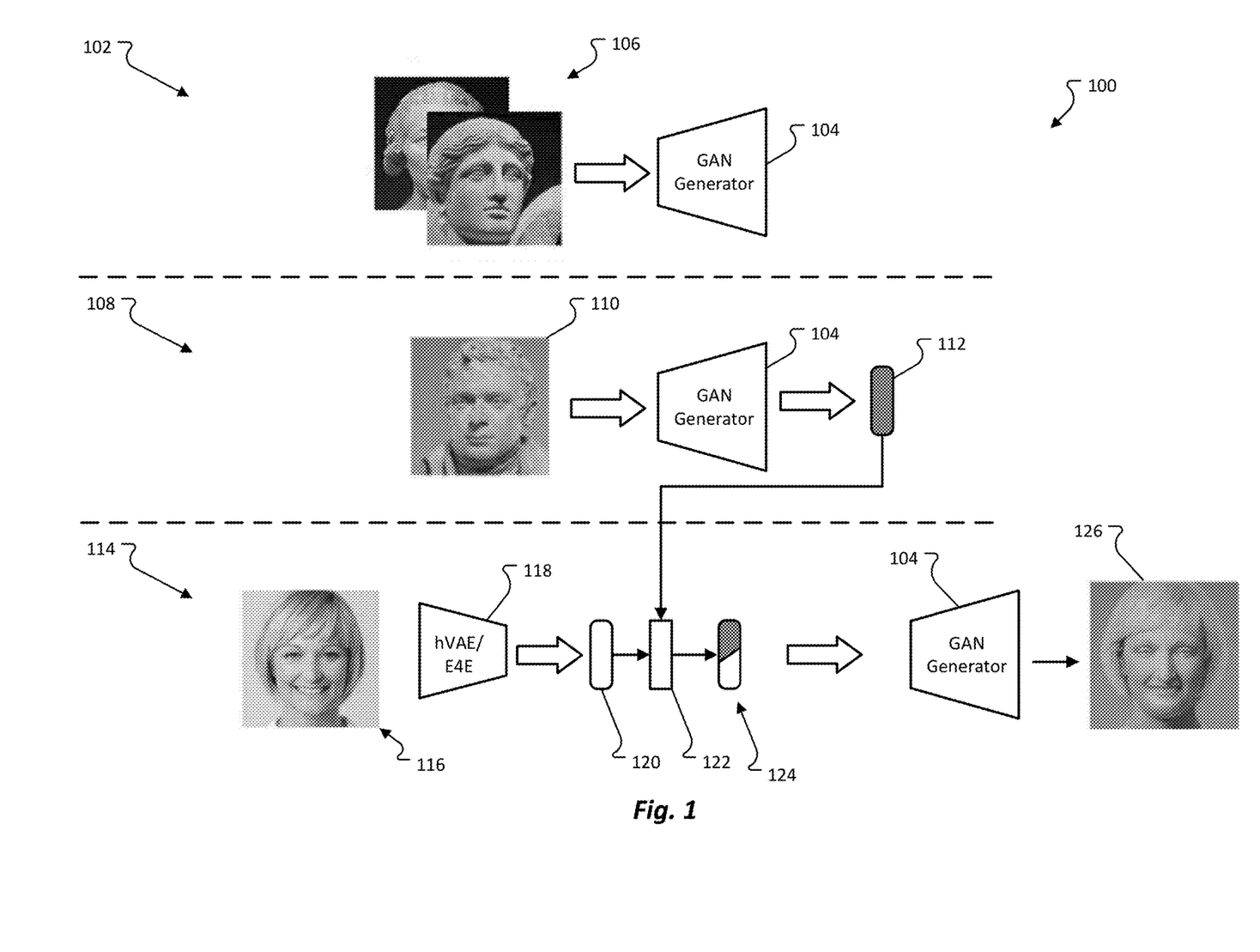
FIG. 1 depicts an example of a dataflow process for obtaining a generated image with a texture that is consistent with a style exemplar image, utilizing a latent code blending operation in accordance with examples of the present disclosure.

FIG. 1 depicts an example of a dataflow process 100 for obtaining a generated image with a texture that is consistent with a style exemplar image, utilizing a latent code blending operation in accordance with examples of the present disclosure. In examples, during a first operation 102, a GAN generator 104, and more specifically an AgileGAN generator, may be trained utilizing a plurality of images depicting a desired style. A starting baseline for training the AgileGAN generator includes using a pre-trained GAN model (e.g., StyleGAN-based model and/or StyleGAN2 model). The pre-trained GAN model (e.g., StyleGAN-based model and/or StyleGAN2 model) exhibits the property that if random samples from a Gaussian distribution in the Z latent space are acquired, the model can generate images fitting the original training distribution, for example, the original training distribution of the dataset. Training the AgileGAN model may include two stages. The task of training involves using an image as input; therefore, a corresponding latent vector for the GAN model (e.g., StyleGAN-based model and/or StyleGAN2 model) model is determined. A front-end encoder, such as the hierarchical variational encoder, is trained to map input images (e.g., exemplar images 106) to latent spaces while keeping a back-end GAN generator fixed. In a second process, starting from a copy of the pre-trained GAN model (e.g., StyleGAN-based model and/or StyleGAN2 model), the pre-trained GAN model (e.g., StyleGAN-based model and/or StyleGAN2 model) is fine-tuned such that a sample from a Gaussian distribution in the latent space can generate images that better fit the stylistic exemplars. In examples, the two training stages are executed independently and can be trained in parallel. However, structurally the two training stages share pivot latent spaces, and are also jointly anchored by the fixed GAN generator 104. By separating inversion training and image generation training into two stages as previously mentioned, the training of the AgileGAN model does not require paired datasets; thus, the separation of training also enables higher resolutions by reducing a computational load in making back-propagation process more effective and efficient. Rather than fine-tune the architecture of the AgileGAN model, new style domains can be incorporated by fine-tuning the generators.

Traditional autoencoders generally lack the ability to generate new images because the resulting latent space is discontinuous. To force the autoencoder utilized during a training of the GAN generator 104 to generate a continuous latent space, an output vector of means and an output vector of standard deviations are utilized. Training the hierarchical variational encoder includes optimizing for Kullback-Leibler divergence (e.g., a mean close to 0 and a standard deviation close to 1) in addition to image reconstruction and other losses which may rely on the means and standard deviations. The standard deviation and the mean may be sampled, generating the latent z vector corresponding to an input image of the plurality of input image. While a typical variational autoencoder includes an encoder $\varepsilon\theta$ and a decoder $G\phi$ (e.g., the GAN generator 104) with respective parameters $\theta$ and $\phi$, which are trained jointly to minimize reconstruction error between input image x (e.g., an image of the plurality of training images 106) and output image x (e.g., an image generated by the GAN generator 104), the hVAE for inversion uses a fixed original pre-trained GAN model (e.g., StyleGAN-based model and/or StyleGAN2 model) as the decoder $G\phi o$ (e.g., GAN generator 418), and the hVAE is trained to learn the posterior distribution $q(z|x)$. Additional details for training the GAN generator 104 and a hierarchical variational autoencoder (e.g., have 118) can be found in U.S. patent application Ser. No. 17/321,384, titled "A HIGH-RESOLUTION PORTRAIT STYLIZATION FRAMEWORKS USING A HIERARCHICAL VARIATIONAL ENCODER" the contents of which is herein incorporated by reference for all that it teaches and for all purposes.

During a second operation 108, a selected exemplar texture image 110 may be projected into a vector 112 based on the latent space using the trained GAN generator 104, and more specifically, the AgileGAN generator. The selected exemplar may represent the desired texture or style that is of interest such that the resulting image 126 has a texture that is the same as or similar to the texture of the selected exemplar texture image 110. In examples, the projection uses an optimization process to determine suitable latent codes 112 in a W+ space used to train the GAN generator 104 such that the GAN generator 104 can generate the selected exemplar. The following are the objective loss function, where G denotes the trained AgileGAN generator, and Ie is the selected exemplar:

$$\text{Loss} = \|G(w_e) - I_e\|_2$$

During a third operation 114, an output image 126 may be generated based on a user input image 116. In examples, the user input image 116 is projected into vector 120 in a latent space using a hVAE and/or an E4E (encoder for editing) encoder. In examples, the latent space may be coded as the W space as Wu, where the vector 120 may be coded with 18×512 dimensions. The vector 112 and the vector 120 may then be blended at a latent space blender 122 to generate the vector 124. That is, the code representing the user input image 116 that is generated from the encoder 118 is blended with the code representing the exemplar texture image 110 that is generated from the GAN generator 104. In some examples, the blending process includes concatenating the first 8 sub-codes of the vector 120 and the last 10 sub-codes of the vector 112. The GAN generator 104 may then be used to generate a final output image 126 using the latent space blended vector 124. Additional details of the encoder 118, which may be a hierarchical variational encoder (hVAE) or an encoder for editing (E4E) can be found in "AgileGAN: stylizing portraits by inversion-consistent transfer learning," ACM Transactions on Graphics Volume 40, Issue 4, August 2021 Article No.: 117pp 1-13 and "Designing an encoder for StyleGAN image manipulation," ACM Transactions on Graphics Volume 40, Issue 4, August 2021 Article No.: 133 pp 1-14, the contents of which are herein incorporated by reference for all that they teach and for all purposes.

Figure 2:
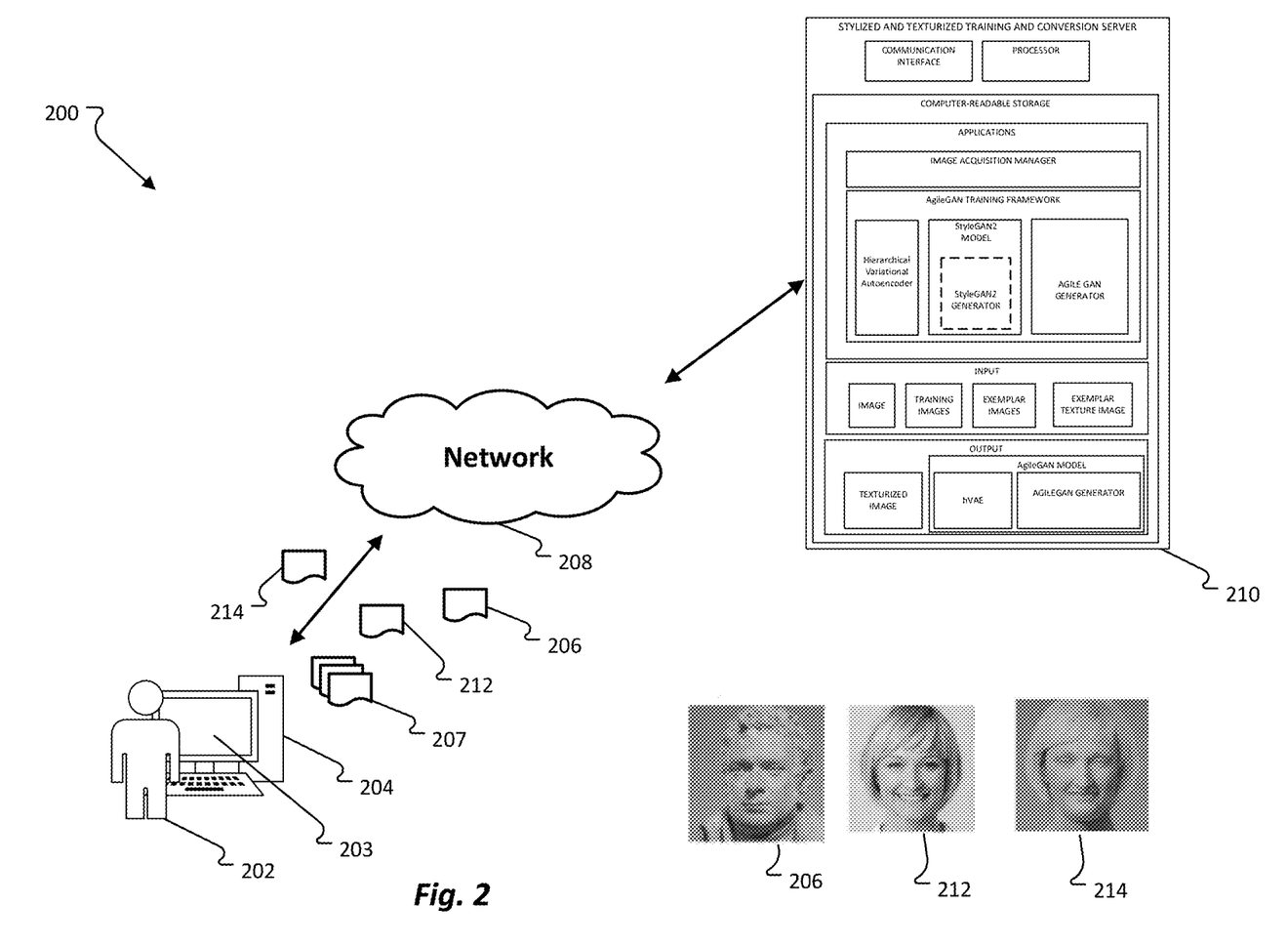
FIG. 2 depicts aspects of the stylized training and stylized and texturized image generation system in accordance with examples of the present disclosure.

FIG. 2 depicts aspects of the stylized training and stylized and texturized image generation system 200 in accordance with examples of the present disclosure. The stylized training and stylized and texturized image generation system 200 generally includes a computing device 204 communicatively coupled to a stylized training and stylized training and texturizing conversion server 210 via a network 208. In examples, a user 202 may select a plurality of training images and provide the plurality of training images to the stylized training and stylized training and texturizing conversion server 210 to train a hVAE. In addition, the user 202 may provide a plurality of exemplar images 207 to the stylized training and stylized training and texturizing conversion server 210 to train a stylization and texturizing model. For example, the plurality of exemplar images 207 may correspond to examples of cartoon characters, animals, etc. and represent a desired style. In some examples, the plurality of exemplar images 207 may be specific to a particular attribute that the user 202 would like enhanced or otherwise prefer to see in the resulting stylized images. In addition, one or more exemplar texture images may be provided to the stylized training and stylized training and texturizing conversion server 210 to obtain an image having a desired texture. The stylized training and stylized training and texturizing conversion server 210 may utilize transfer learning to train a pre-trained GAN model (e.g., StyleGAN2 and/or StyleGAN-based) using the plurality of exemplar images 207. In some examples, following training, the stylized training and stylized training and texturizing conversion server 210 may output a trained AgileGAN model including a trained hVAE encoder and generator. The hVAE may be trained using a large quantity of high-quality images. Alternatively, or in addition, the stylized training and stylized training and texturizing conversion server 210 may receive one or more input images 212, generate one or more stylized and texturized images 214 based on the one or more input images 212, and provide the one or more stylized and texturized images 214 to the computing device 204 of the user 202. The one or more stylized and texturized images 214 may be displayed at a user interface 203 of the computing device 204.

Figure 3:
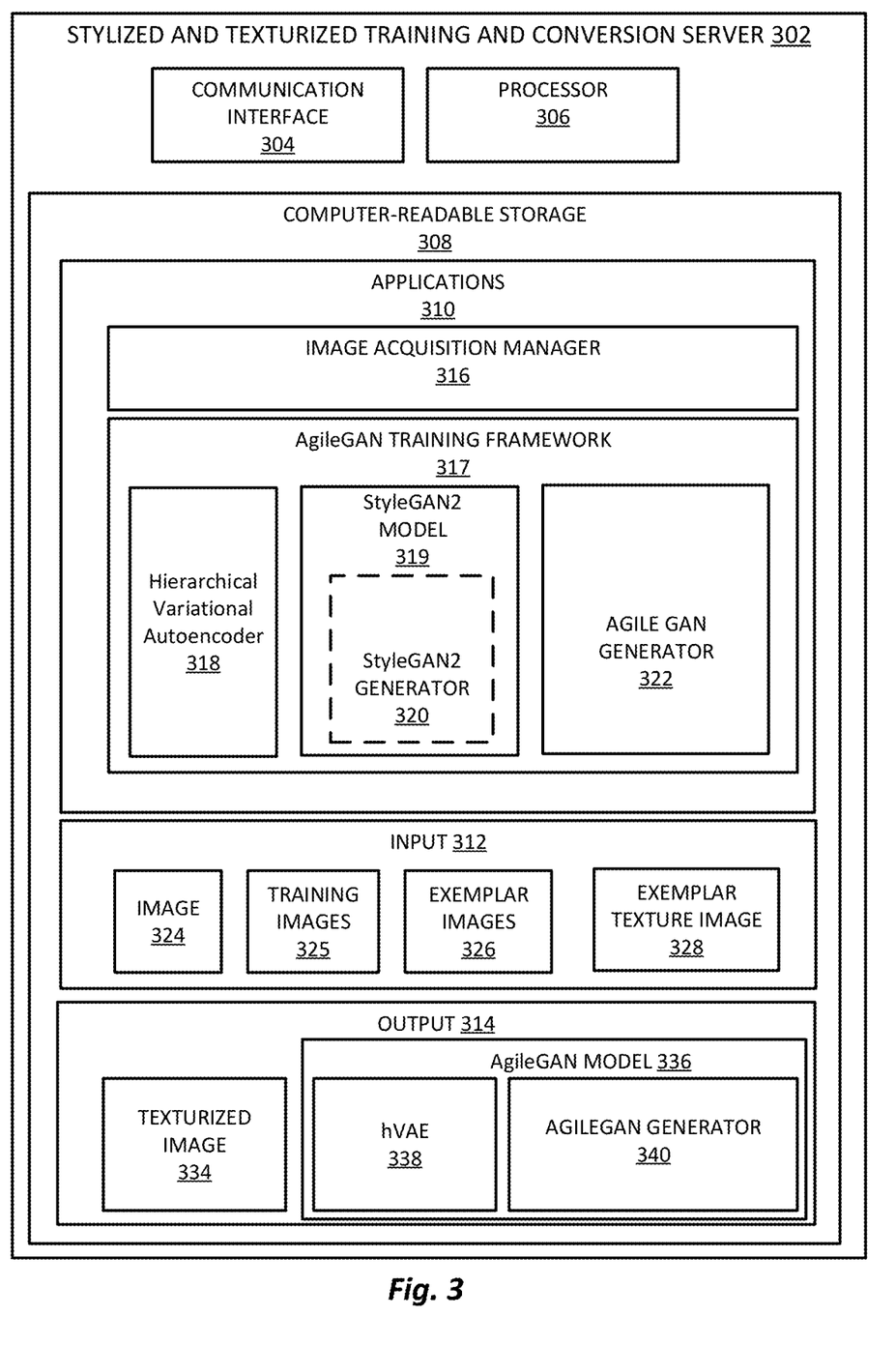
FIG. 3 depicts details of a stylized and texturized training and conversion server in accordance with examples of the present disclosure.

FIG. 3 depicts details of a stylized and texturized training and conversion server 302 in accordance with examples of the present disclosure. More specifically, the stylized and texturized training and conversion server 302 may be the same as or similar to the stylized and texturized training and conversion server 210 previously discussed. The stylized and texturized training and conversion server 302 may include a communication interface 304, a processor 306, and a computer-readable storage 308 including one or more application 310. In examples, the communication interface 304 may be coupled to a network and receive the plurality of training images 325, the plurality of stylistic exemplar images 326, one or more exemplar texture images 328, and one or more input images 324 for stylization and texturizing. The image acquisition manager 316 may manage the acquisition of the images, and in some instances, may perform preprocessing of the images to ready for training, stylization, and/or texturization. The image 324 may be the same as or similar to the input image 212 (FIG. 2); the training images 325 may be the same as or similar to the training images 206 (FIG. 2); the exemplar stylistic images 326 may be the same as or similar to the exemplar images 207 (FIG. 2), and the exemplar texture image 328 may be the same as or similar to the exemplar texture image 206 (FIG. 2). While the image 324, training images 325, exemplar stylistic images 326, and exemplar texture image 328 are depicted as being input 312, other information and input may be received at the communication interface 304 and stored as input 312. For example, one or more model parameters (e.g., hyper parameters, model configurations, Z+ spaces, etc. . . . ) may be received at the communication interface 304 and stored as input 312.

The stylized and texturized training and conversion server 302 includes an AgileGAN training framework 317 for training the encoder (e.g., hVAE 318) and the GAN generator 322 (e.g., AgileGAN generator). The AgileGAN training framework 317 may include a pre-trained GAN model (e.g., StyleGAN-based model and/or StyleGAN2 model) 319 including a pre-trained GAN generator 320 (e.g., StyleGAN-based generator and/or StyleGAN2 generator). In examples, the hVAE 318 and the GAN generator 322 may be trained independently of one another. Using the training images 325 together with the GAN generator 320, the hVAE 318 may be trained for inversion by learning the posterior distribution of the GAN model 319 using the fixed pre-trained GAN model 319 as a decoder. Given a small set of stylistic exemplars, for example those exemplar images stored as exemplar stylistic images 326, the AgileGAN training framework 317 can utilize transfer learning to train the GAN generator 322 using the pre-trained GAN model 319. Accordingly, the stylized and texturized training and conversion server 302 can output (e.g., as 314) an AgileGAN framework 336 including a trained hVAE 338 and a trained GAN generator 340 (e.g., AgileGAN generator) for generating stylized images from real portrait images. Similarly, as a post-processing step, the stylized and texturized training and conversion server 302 may texturize or otherwise generate a texturized image as an output image. In one example, the GAN generator 340 can be implemented by another device instead of the stylized and texturized training and conversion server 302 to perform the operation of generating stylized images from real portrait images. Alternatively, or in addition, the stylized and texturized training and conversion server 302 may receive an input of an image 324, an exemplar texture image 328, and generate a stylized and texturized image 334. The stylized and texturized image 334 may be recognizable as the input subject's identity and may preserve the subject's pose and expression along with a desired texture. In addition, the stylized and texturized image 334 may be rendered in a style and texture that is consistent with the provided stylistic exemplars and exemplar texture image, such as the exemplar stylistic images 326 and exemplar texture image 328. In examples, the stylized and texturized training and conversion server 302 may perform both model training and stylized and texturized image generation, only model training, or only stylized and texturized image generation.

Figure 4:
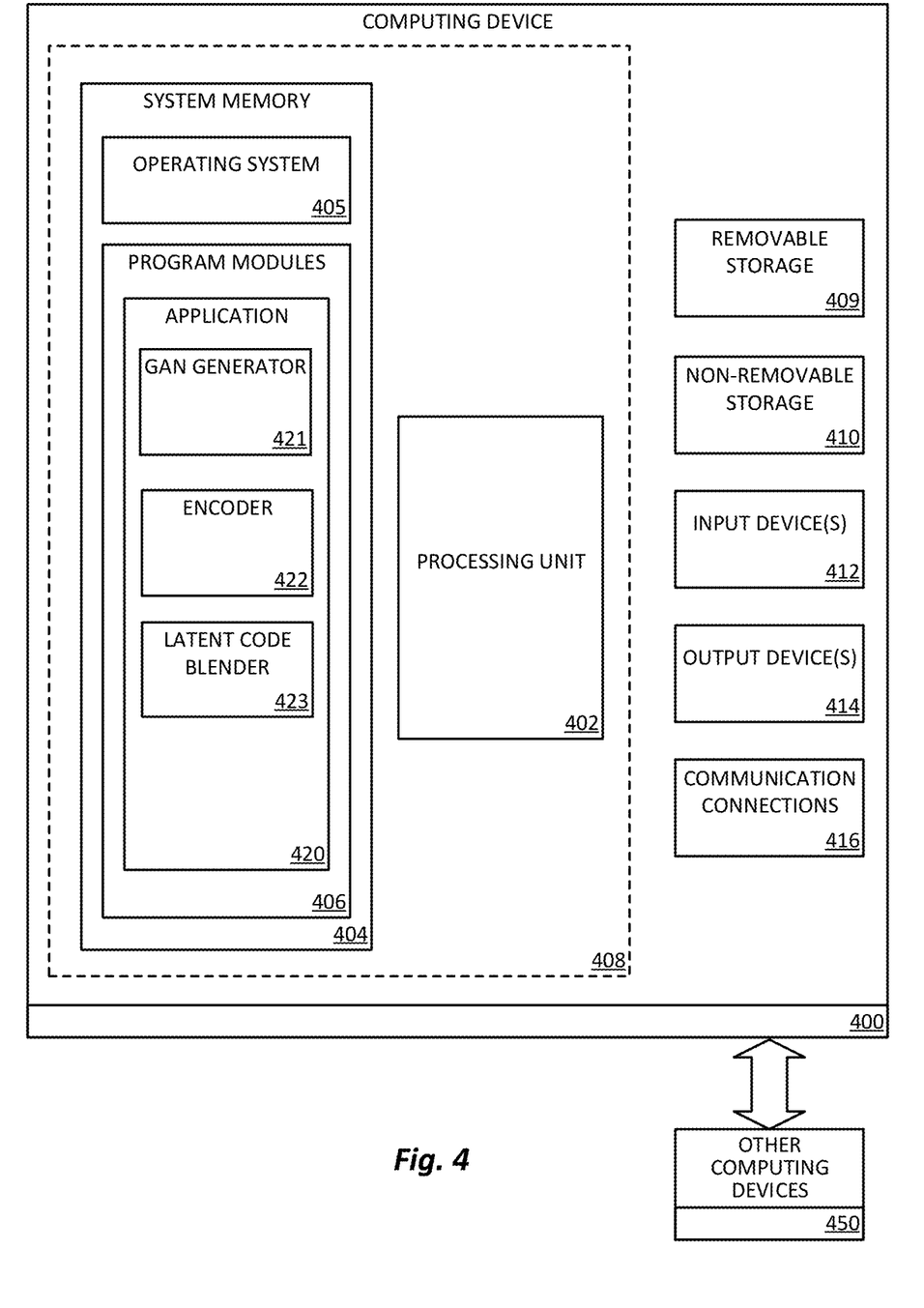
FIG. 4 is a block diagram illustrating physical components (e.g., hardware) of a computing system with which aspects of the disclosure may be practiced and in accordance with examples of the present disclosure.

FIG. 4 is a block diagram illustrating physical components (e.g., hardware) of a computing system 400 with which aspects of the disclosure may be practiced. The computing device components described below may be suitable for the computing and/or processing devices described above. In a basic configuration, the computing system 400 may include at least one processing unit 402 and a system memory 404. Depending on the configuration and type of computing device, the system memory 404 may comprise, but is not limited to, volatile storage (e.g., random-access memory (RAM)), non-volatile storage (e.g., read-only memory (ROM)), flash memory, or any combination of such memories.

The system memory 404 may include an operating system 405 and one or more program modules 406 suitable for running software application 420, such as one or more components supported by the systems described herein. As examples, system memory 404 may include a GAN generator 421, an encoder 422, and a latent code blender 423. The GAN generator 421 may be the same as or similar to the the GAN generator 104 (FIG. 1) and may refer to an AgileGAN generator as previously described. The encoder 422 may be the same as or similar to the encoder 118 and may refer to a hierarchical variational encoder (hVAE) and/or an encoder for editing (E4E) as previously described. The latent code blender 423 may be the same as or similar to the latent code blender 122 as previously described. The operating system 405, for example, may be suitable for controlling the operation of the computing system 400.

Furthermore, examples of the present disclosure may be practiced in conjunction with a graphics library, other operating systems, or any other application program and is not limited to any particular application or system. This basic configuration is illustrated in FIG. 4 by those components within a dashed line 408. The computing system 400 may have additional features or functionality. For example, the computing system 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., software applications 420) may perform processes including, but not limited to, the aspects, as described herein. Other program modules may be used in accordance with aspects of the present disclosure. Furthermore, examples of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 400 may also have one or more input device(s) 412 such as a keyboard, a mouse, a pen, a sound or voice input device, a touch or swipe input device, etc. The one or more input device 412 may include an image sensor. The output device(s) 414 such as a display, speakers, a printer, etc. may also be included. The aforementioned devices are examples and others may be used. The computing system 400 may include one or more communication connections 416 allowing communications with other computing devices/systems 450 as shown in FIG. 4. Examples of suitable communication connections 416 include, but are not limited to, radio frequency (RF) transmitter, receiver, and/or transceiver circuitry; universal serial bus (USB), parallel, and/or serial ports. The computing system 400 may represent one or more of the computing device 204 and/or the stylized and texturized training and conversion server 302.

The term computer readable media as used herein may include computer storage media. Computer storage media may include volatile and nonvolatile, removable, and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 400. Any such computer storage media may be part of the computing system 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5:
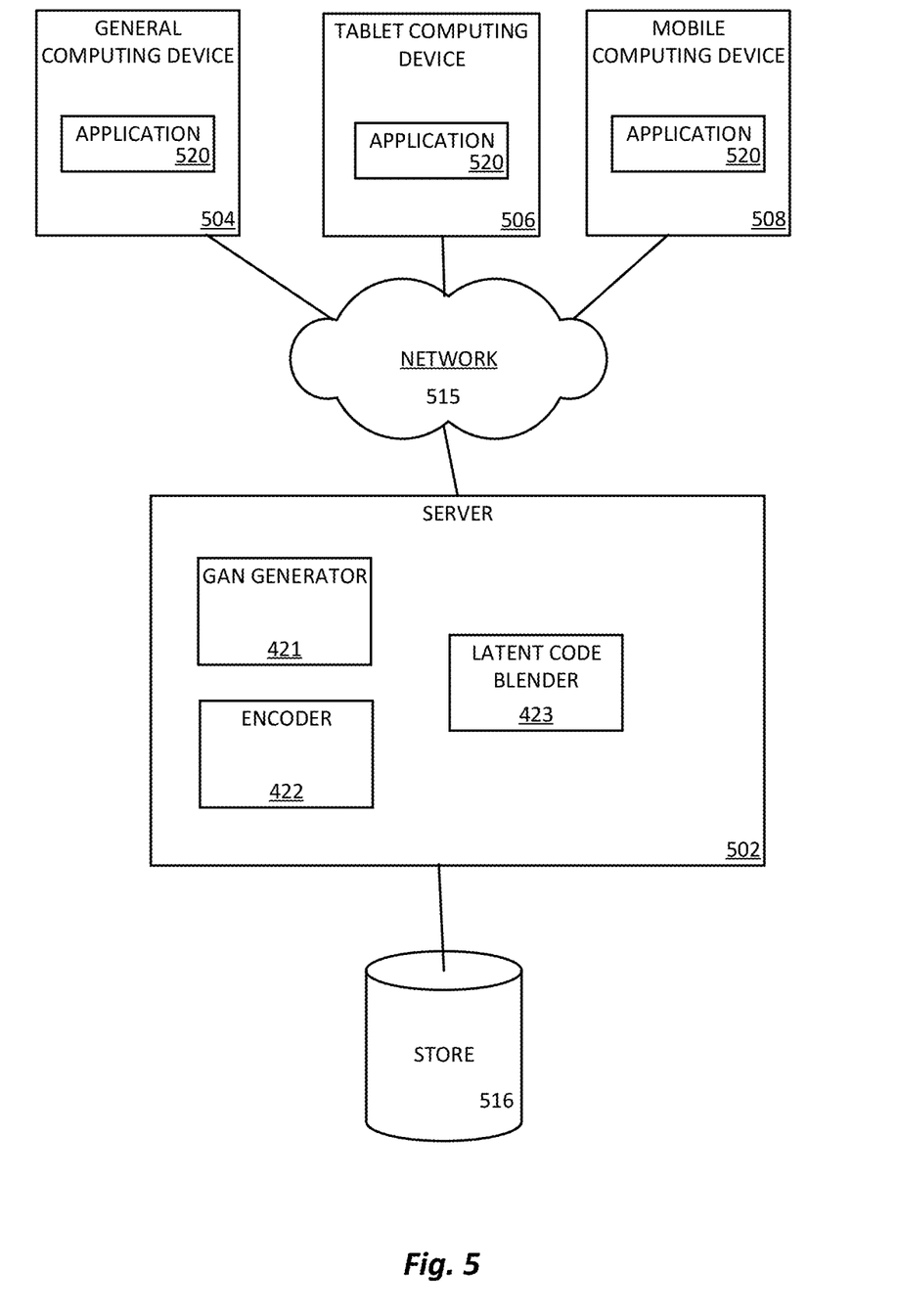
FIG. 5 illustrates one aspect of the architecture of a system for processing data received at a computing system from a remote source in accordance with examples of the present disclosure.

FIG. 5 illustrates one aspect of the architecture of a system for processing data received at a computing system from a remote source, such as a personal computer 504, tablet computing device 506, or mobile computing device 508. The personal computer 504, tablet computing device 506, or mobile computing device 508 may include one or more applications 520; such applications may include but are not limited to the GAN generator 421, the encoder 422, and the latent code blender 423. Content at a server device 502 may be stored in different communication channels or other storage types. For example, various documents may be stored using a directory service, a web portal, a stylized image service, an instant messaging store, or social networking services.

One or more of the previously described program modules 406 or software applications 420 may be employed by the server device 502 and/or the personal computer 504, tablet computing device 506, or mobile computing device 508, as described above. For example, the server device 502 may include the GAN generator 421, the encoder 422, and the latent code blender 423 previously described.

The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these examples of the computing devices may obtain content from the store 516, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
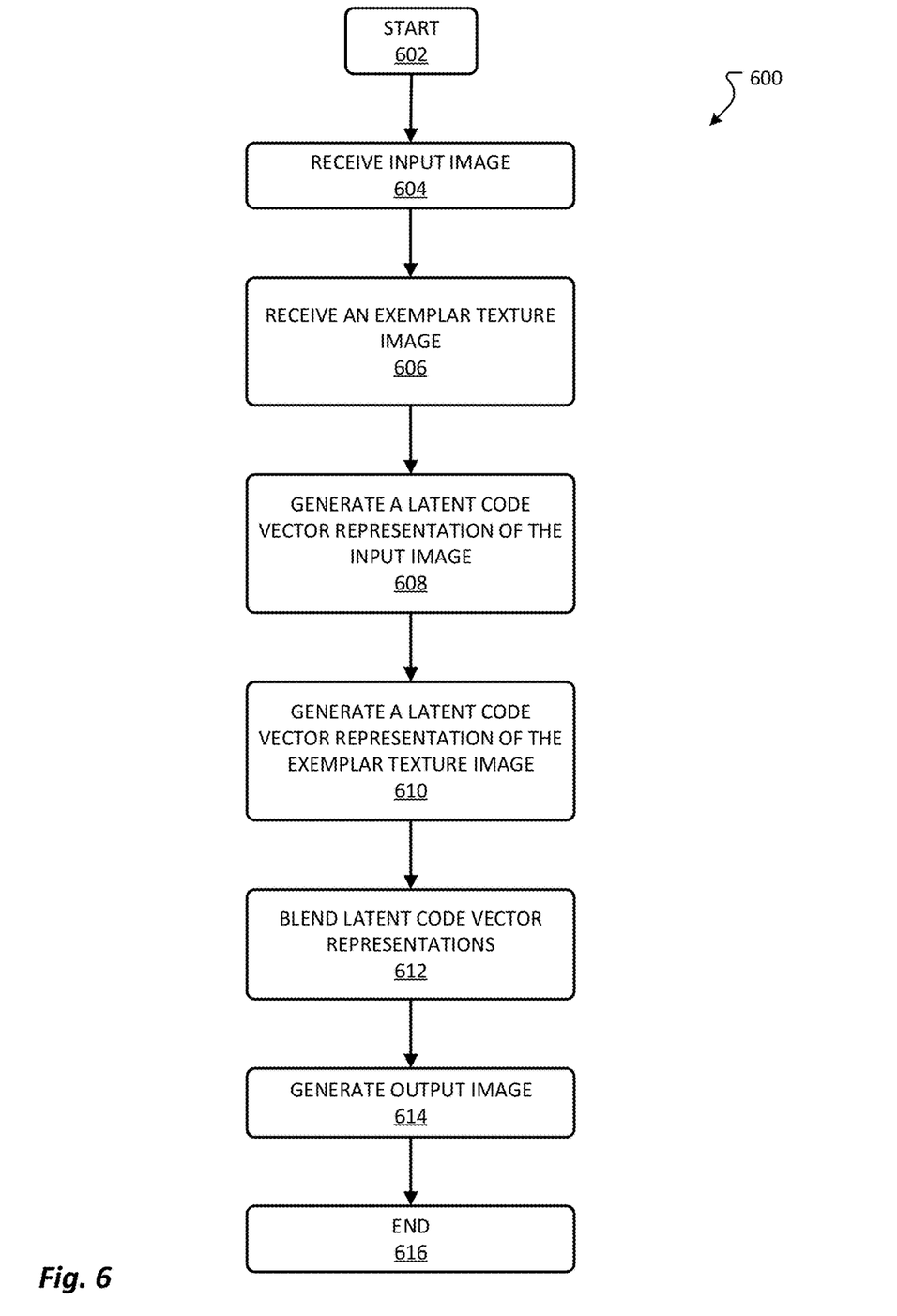
FIG. 6 depicts details of a method for generating a texturize image from an input image in accordance with examples of the present disclosure.

FIG. 6 depicts an exemplary method 600 for generating a stylized and texturized image based on an original photo in accordance with examples of the present disclosure. A general order for the steps of the method 600 is shown in FIG. 6. Generally, the method 600 starts at 602 and ends at 616. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method 600 starts at 602, where flow may proceed to 604. At 604, an input image may be received. For example, a user may provide an input image and/or a system may select an input image from a storage location. The input image may correspond to the input image 116 (FIG. 1). At 606, an exemplar texture image may be received. Similar to the input image receive at 604, an exemplar texture image may be selected and/or a system may select an exemplar texture image from a storage location. The exemplar texture image may correspond to the exemplar texture image 110 (FIG. 1). Accordingly, the method may proceed to 608, where a latent code vector representation of the input image may be generated. In example, an encoder such as the hvAE and/or E4E encoder 118 (FIG. 1) may be utilized to generate the latent code vector representation. The method 600 may then proceed to 610, where a latent code vector representation of the exemplar texture image may be generated. In examples, a GAN generator, such as an AgileGAN generator may be utilized to generate the latent code vector representation of the exemplar texture image.

The method 600 may then proceed to 612, where the latent code vector representation of the exemplar texture image is blended with the latent code vector representation of the input image. For example, a latent space or latent code blender (e.g., 122) may blend the latent code vector representation of the exemplar texture image with the latent code vector representation of the input image to generate a resulting latent code vector. That is, the code representing the user input image that is generated from an encoder is blended with the code representing the texture exemplar that is generated from the GAN generator. In some examples, the blending process includes concatenating the first eight sub-codes of the latent code vector representation (e.g., 120) of the input image (e.g., 116) and the last ten sub-codes of the latent code vector representation (e.g., 112) of the exemplar texture image (e.g., 110). Of course a different amount of sub-codes from each of the latent code vector representation of the exemplar texture image and/or the latent code vector representation of the input image may be blended. The GAN generator (e.g., 104) may then be used to generate a final output image (e.g., 126) using the resulting latent code vector at step 614. In some examples, the resulting output image may then be provided to a user and/or a computing device associated with a user. The method 600 may then end at 616.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for generating a texturized image according to at least the examples provided in the sections below:

(A1) In one aspect, some examples include a method for generating a texturized image. The method may include: receiving an input image, receiving an exemplar texture image, generating, using an encoder, a first latent code vector representation based on the input image, generating, using a generative adversarial network generator, a second latent code vector representation based on the exemplar texture image, blending the first latent code vector representation and the second latent code vector representation to obtain a blended latent code vector representation, generating, by the GAN generator, a texturized image based on the blended latent code vector representation and providing the texturized image as an output.

(A2) In some examples of A1, blending the first latent code vector representation and the second latent code vector representation to obtain the blended latent code vector representation comprises concatenating sub-codes of the first latent code vector representation and sub-codes of the second latent code vector representation.

(A3) In some examples of A1-A2, concatenating sub-codes of the first latent code vector representation and sub-codes of the second latent code vector representation comprises concatenating the first eight sub-codes of the first latent code vector representation and the last ten sub-codes of the second latent code vector representation.

(A4) In some examples of A1-A3, the encoder is a hierarchical variational autoencoder.

(A5) In some examples of A1-A4, the first latent code vector representation comprises 18×512 dimensions.

(A6) In some examples of A1-A5, the GAN generator is an AgileGAN generator.

(A7) In some examples of A1-A7, the method further includes: receiving a plurality of exemplar stylistic images; and training the GAN generator using transfer learning based on the received plurality of exemplar stylistic images.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

Advantages in implementing the methods and systems as disclosed herein include the capability of producing a blended and stylized image with a variable amount of structure based on a pre-trained GAN generator. Therefore, an amount of stylization vs. personalization may influence the resulting generated image.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a texturized image, the method comprising:
   receiving a plurality of exemplar stylistic images;
   training a first generative adversarial network (GAN) generator using transfer learning based on the received plurality of exemplar stylistic images;
   receiving a plurality of training images;
   training an encoder using the plurality of training images and another second GAN generator, the encoder trained for inversion by learning a posterior distribution of a fixed pre-trained GAN model, and the encoder using the fixed pre-trained GAN model as a decoder;
   receiving an input image;
   receiving an exemplar texture image;
   generating, using the encoder, a first latent code vector representation based on the input image;
   generating, using the first GAN generator, a second latent code vector representation based on the exemplar texture image;
   blending the first latent code vector representation and the second latent code vector representation to obtain a blended latent code vector representation by concatenating a first predetermined amount of first sub-codes of the first latent code vector representation and a second predetermined amount of last sub-codes of the second latent code vector representation;
   generating, by the first GAN generator, a texturized image based on the blended latent code vector representation; and
   providing the texturized image as an output.

2. The method of claim 1, wherein concatenating the first predetermined amount of first sub-codes of the first latent code vector representation and the second predetermined amount of last sub-codes of the second latent code vector representation comprises concatenating the first eight sub-codes of the first latent code vector representation and the last ten sub-codes of the second latent code vector representation.

3. The method of claim 1, wherein the encoder is a hierarchical variational autoencoder.

4. The method of claim 3, wherein the first latent code vector representation comprises 18×512 dimensions.

5. The method of claim 1, wherein the first GAN generator is an AgileGAN generator.

6. The method of claim 1, wherein training the encoder and training the first GAN generator are executed independently and in parallel.

7. A system, comprising:
   one or more hardware processors configured by machine-readable instructions to:
   receive a plurality of exemplar stylistic images;
   train a first generative adversarial network (GAN) generator using transfer learning based on the received plurality of exemplar stylistic images;
   receive a plurality of training images;
   train an encoder using the plurality of training images and second GAN generator, the encoder trained for inversion by learning a posterior distribution of a fixed pre-trained GAN model, and the encoder using the fixed pre-trained GAN model as a decoder;
   receive an input image;
   receive an exemplar texture image;
   generate, using the encoder, a first latent code vector representation based on the input image;
   generate, using the first GAN generator, a second latent code vector representation based on the exemplar texture image;
   blend the first latent code vector representation and the second latent code vector representation to obtain a blended latent code vector representation by concatenating a first predetermined amount of first sub-codes of the first latent code vector representation and a second predetermined amount of last sub-codes of the second latent code vector representation;

generate, by the first GAN generator, a texturized image based on the blended latent code vector representation; and provide the texturized image as an output.

8. The system of claim 7, wherein concatenating the first predetermined amount of first sub-codes of the first latent code vector representation and the second predetermined amount of last sub-codes of the second latent code vector representation comprises concatenating the first eight sub-codes of the first latent code vector representation and the last ten sub-codes of the second latent code vector representation.

9. The system of claim 7, wherein the encoder is a hierarchical variational autoencoder.

10. The system of claim 9, wherein the first latent code vector representation comprises 18×512 dimensions.

11. The system of claim 7, wherein the first GAN generator is an AgileGAN generator.

12. The system of claim 7, wherein training the encoder and training the first GAN generator are executed independently and in parallel.

13. A non-transitory computer-readable storage medium comprising instructions being executable by one or more processors to cause the one or more processors to:
receive a plurality of exemplar stylistic images;
train a first generative adversarial network (GAN) generator using transfer learning based on the received plurality of exemplar stylistic images;
receive a plurality of training images;
train an encoder using the plurality of training images and second GAN generator, the encoder trained for inversion by learning a posterior distribution of a fixed pre-trained GAN model, and the encoder using the fixed pre-trained GAN model as a decoder;
receive an input image;
receive an exemplar texture image;
generate, using the encoder, a first latent code vector representation based on the input image;
generate, using the first GAN generator, a second latent code vector representation based on the exemplar texture image;
blend the first latent code vector representation and the second latent code vector representation to obtain a blended latent code vector representation by concatenating a first predetermined amount of first sub-codes of the first latent code vector representation and a second predetermined amount of last sub-codes of the second latent code vector representation;
generate, by the first GAN generator, a texturized image based on the blended latent code vector representation; and provide the texturized image as an output.

14. The computer-readable storage medium of claim 13, wherein concatenating the first predetermined amount of first sub-codes of the first latent code vector representation and the second predetermined amount of last sub-codes of the second latent code vector representation comprises concatenating the first eight sub-codes of the first latent code vector representation and the last ten sub-codes of the second latent code vector representation.

15. The computer-readable storage medium of claim 13, wherein the encoder is a hierarchical variational autoencoder.

16. The computer-readable storage medium of claim 15, wherein the first latent code vector representation comprises 18×512 dimensions.

17. The computer-readable storage medium of claim 13, wherein the first GAN generator is an AgileGAN generator.

18. The computer-readable storage medium of claim 13, wherein training the encoder and training the first GAN generator are executed independently and in parallel.

* * * * *